March 12, 1929.  L. D. SOUBIER  1,705,341
GLASS BLOWING MACHINE
Filed Aug. 27, 1923   12 Sheets-Sheet 1

INVENTOR
Leonard D. Soubier
BY J. F. Rule
HIS ATTORNEY

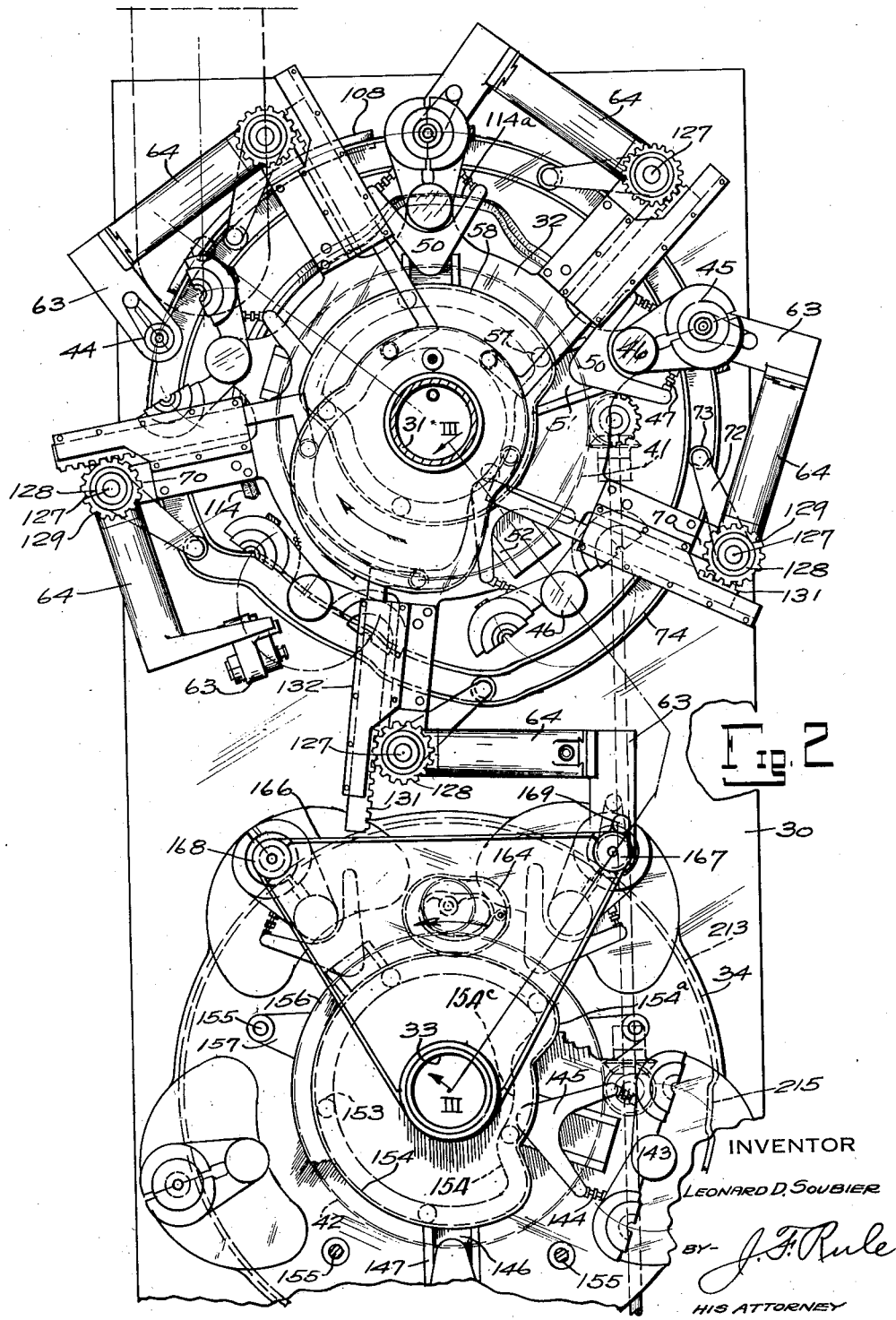

March 12, 1929.  L. D. SOUBIER  1,705,341
GLASS BLOWING MACHINE
Filed Aug. 27, 1923  12 Sheets-Sheet 3
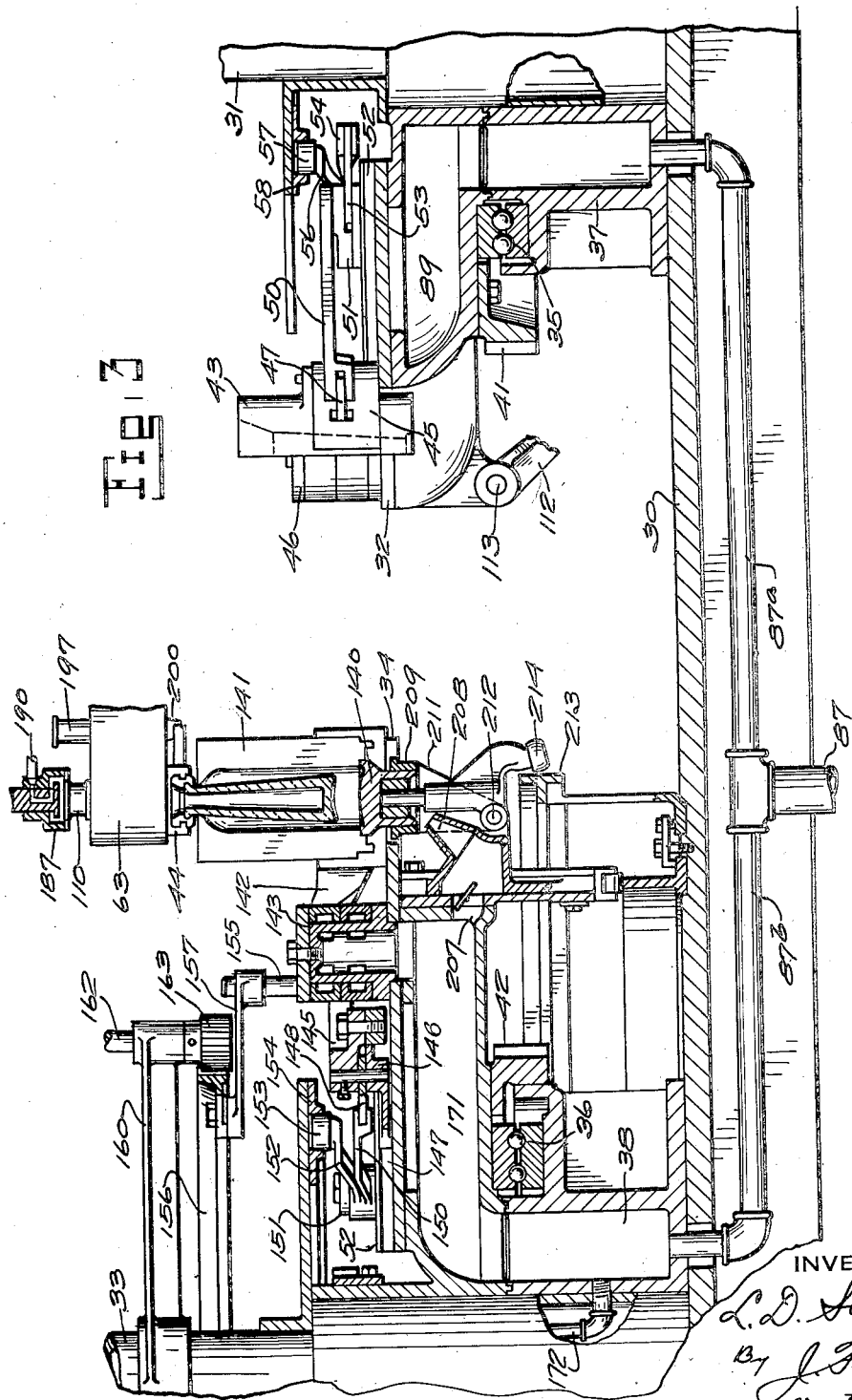

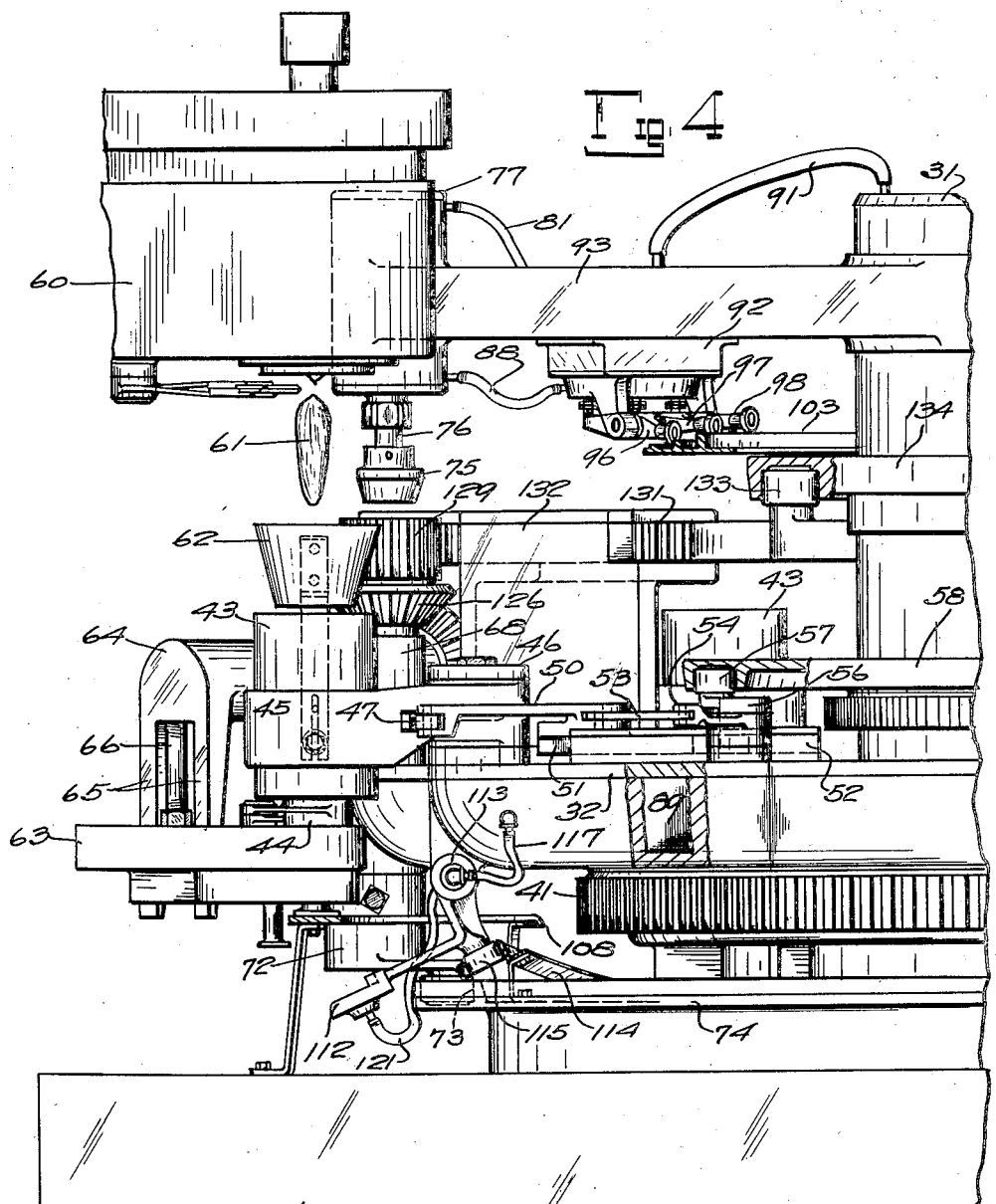

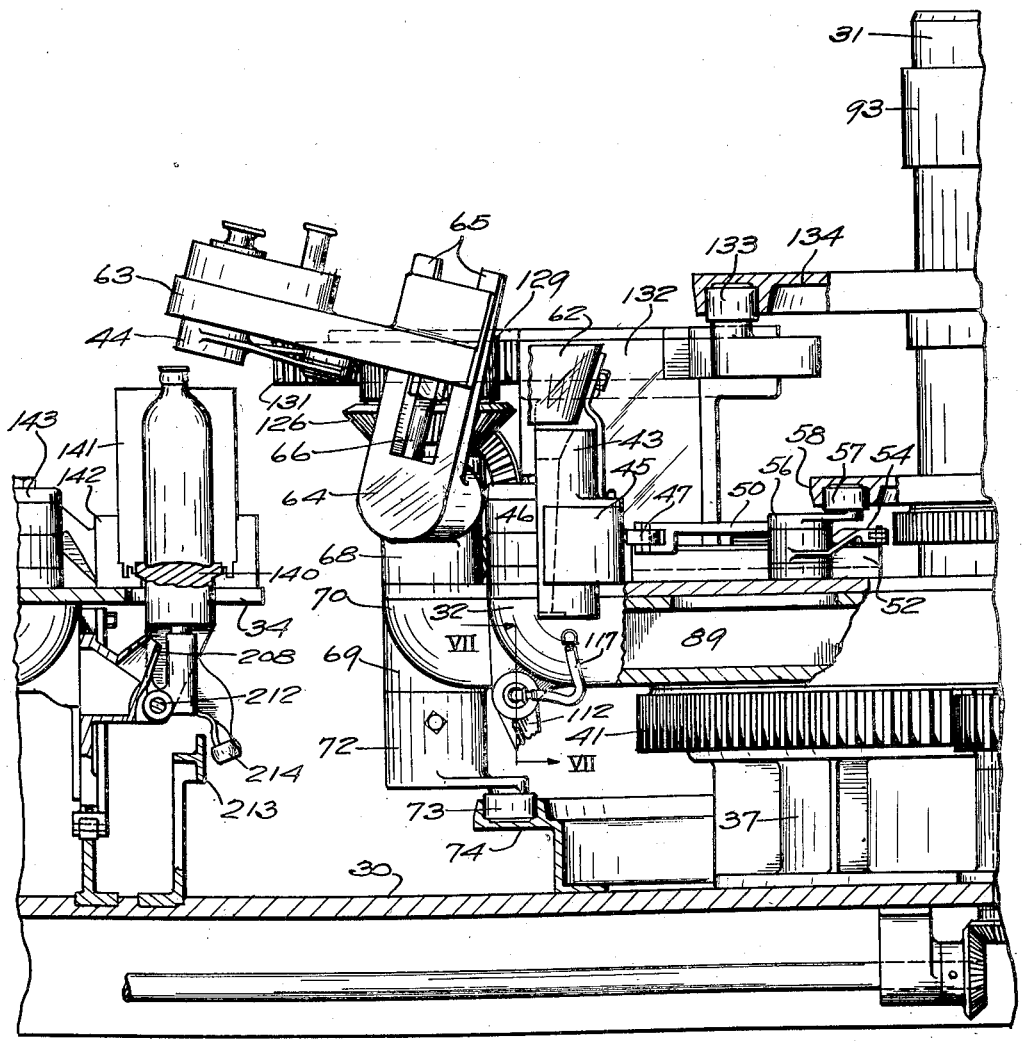

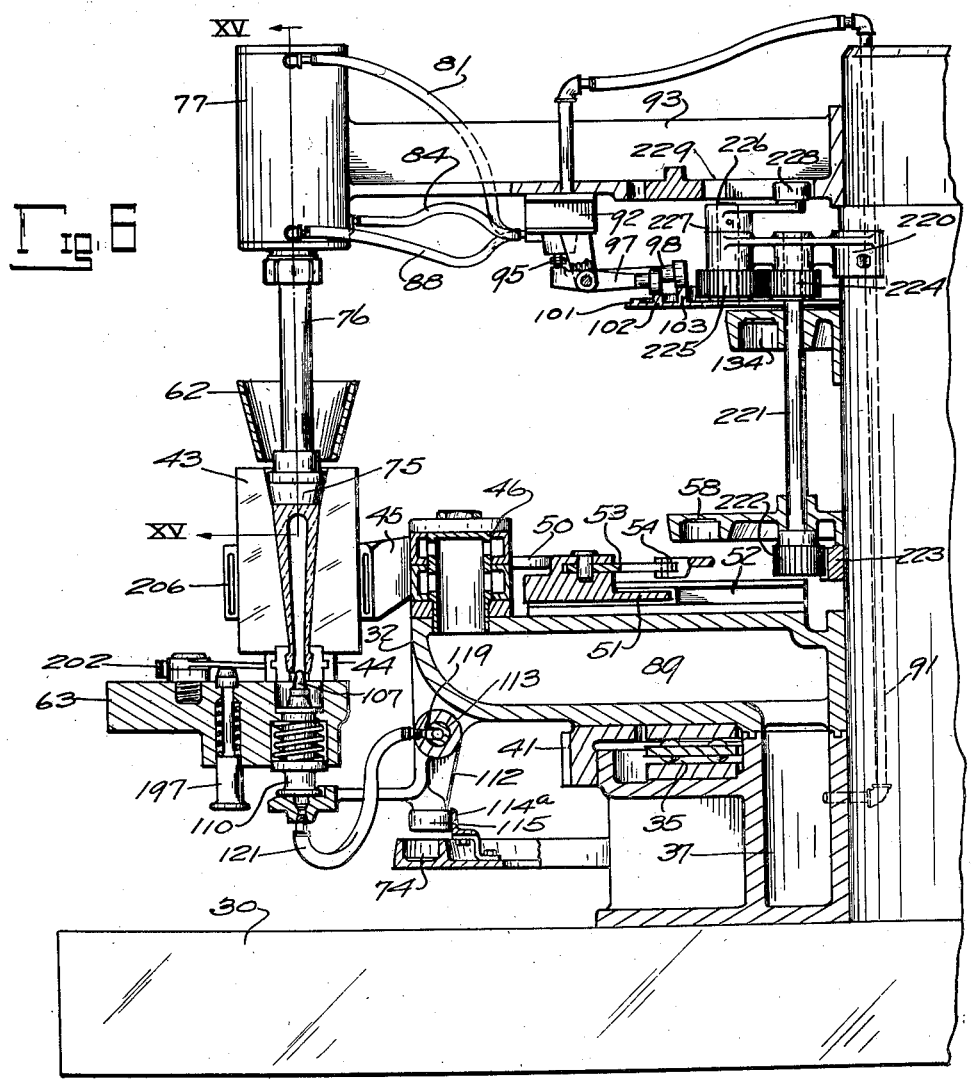
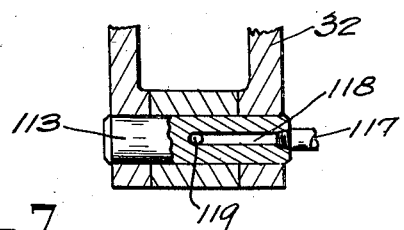

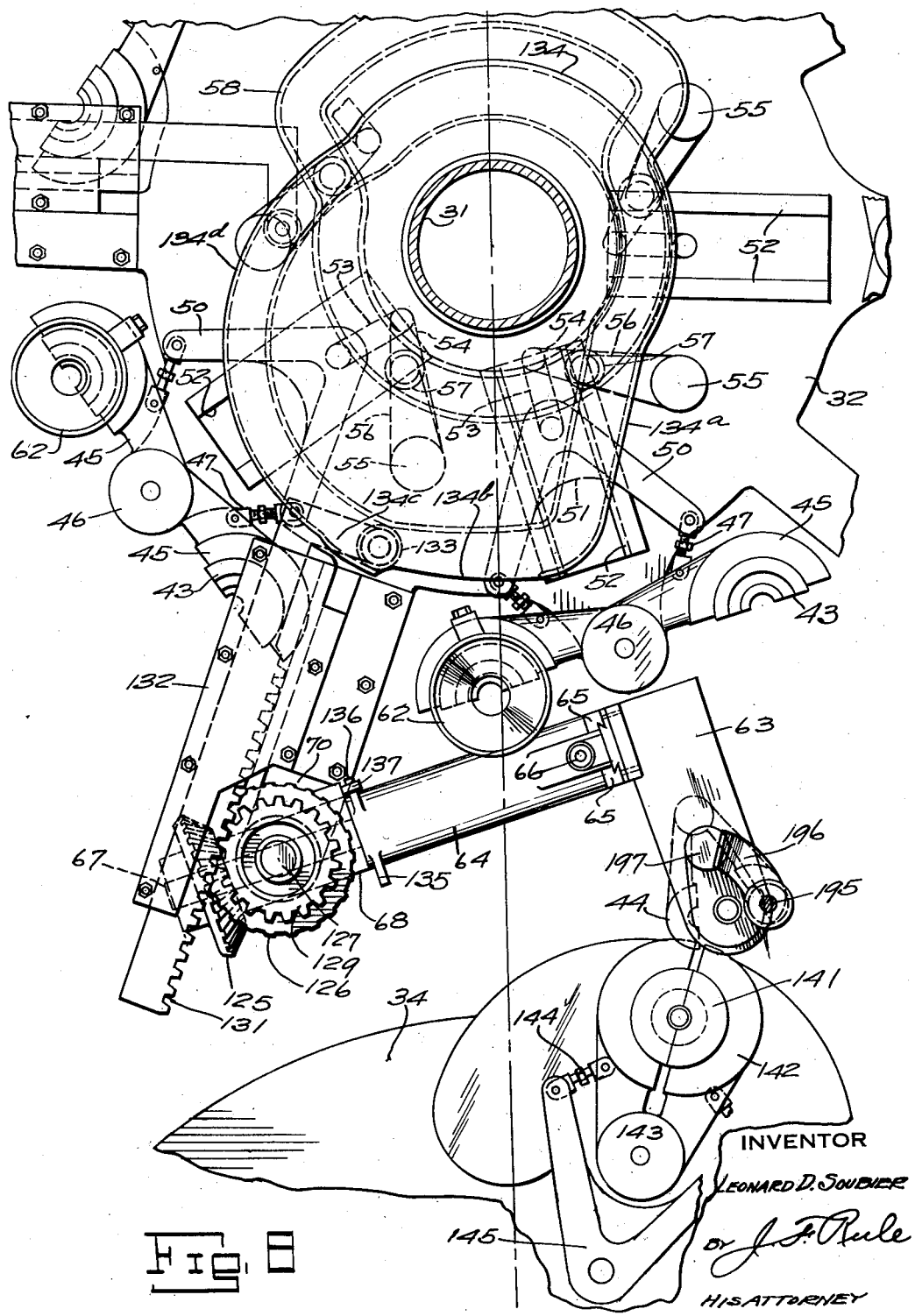

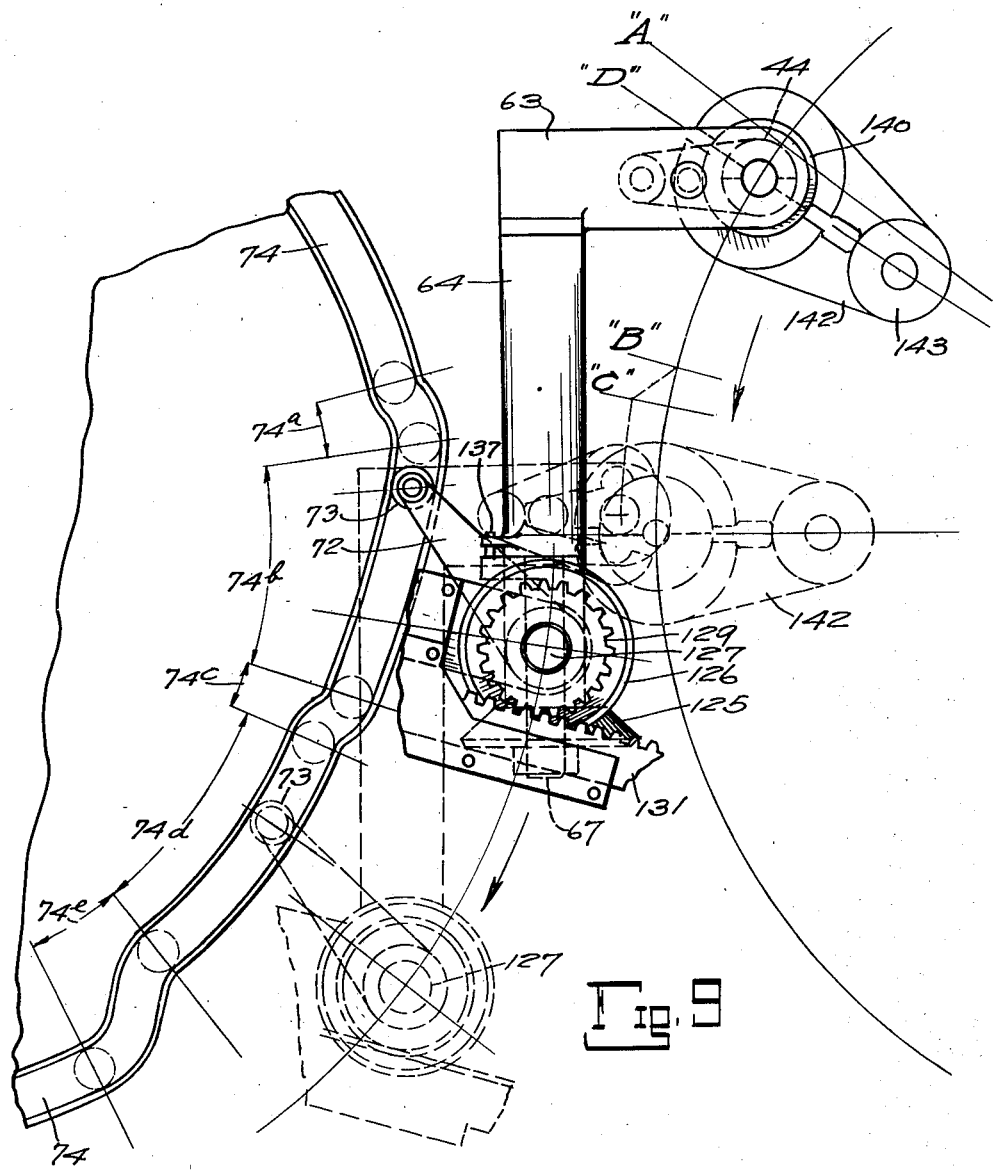

March 12, 1929.  L. D. SOUBIER  1,705,341
GLASS BLOWING MACHINE
Filed Aug. 27, 1923    12 Sheets-Sheet 9
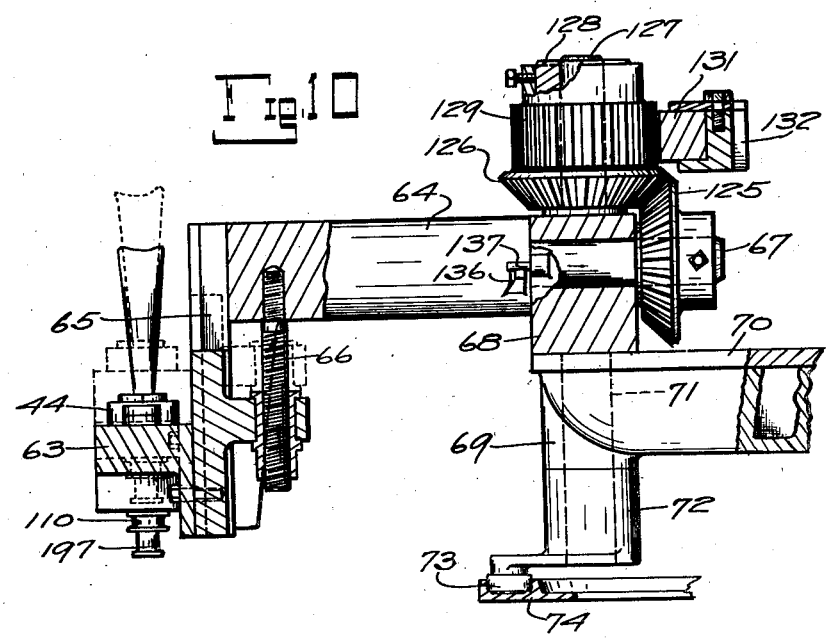
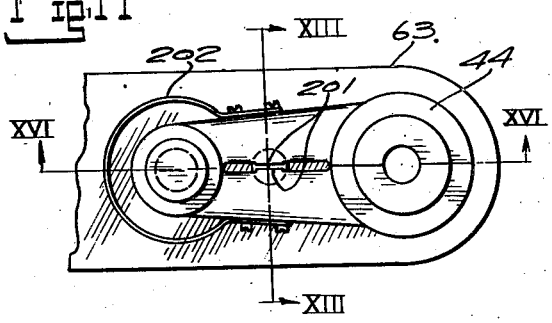
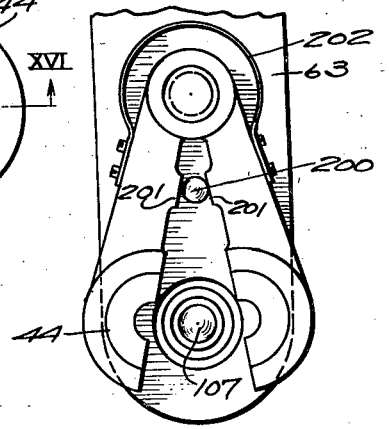
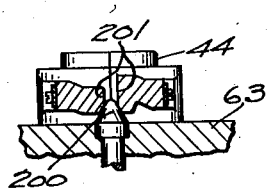
INVENTOR
LEONARD D. SOUBIER
BY J. F. Rule.
HIS ATTORNEY

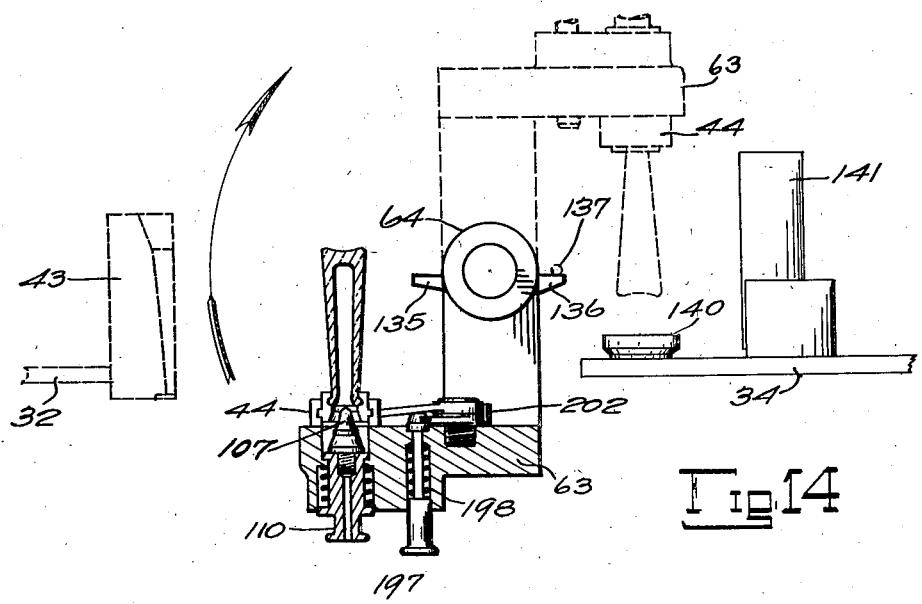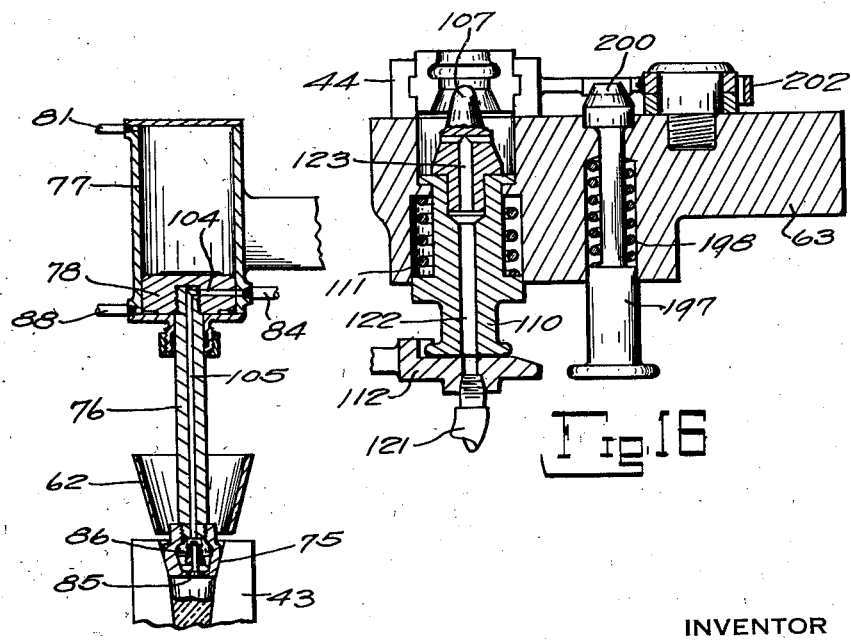

March 12, 1929.  L. D. SOUBIER  1,705,341
GLASS BLOWING MACHINE
Filed Aug. 27, 1923  12 Sheets-Sheet 11
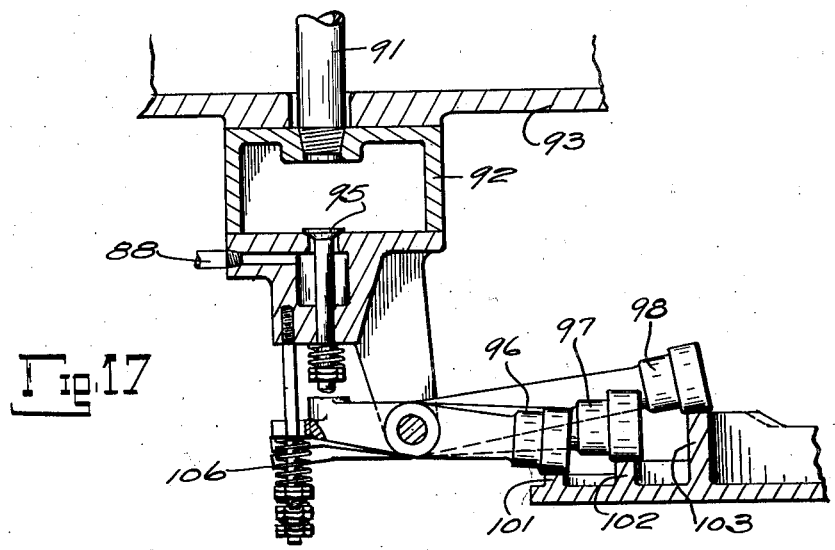
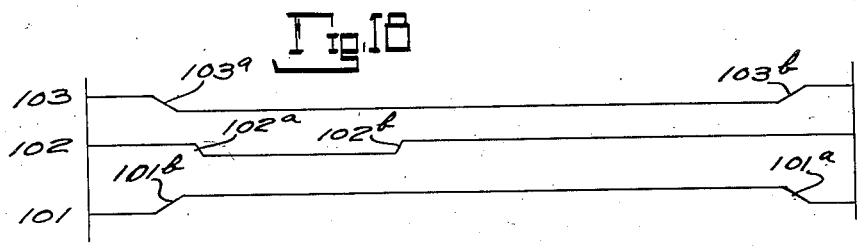
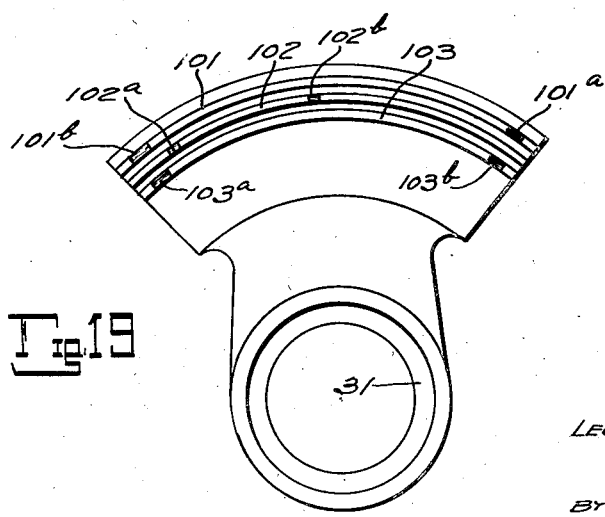
INVENTOR
LEONARD D. SOUBIER
BY J. F. Rule
HIS ATTORNEY

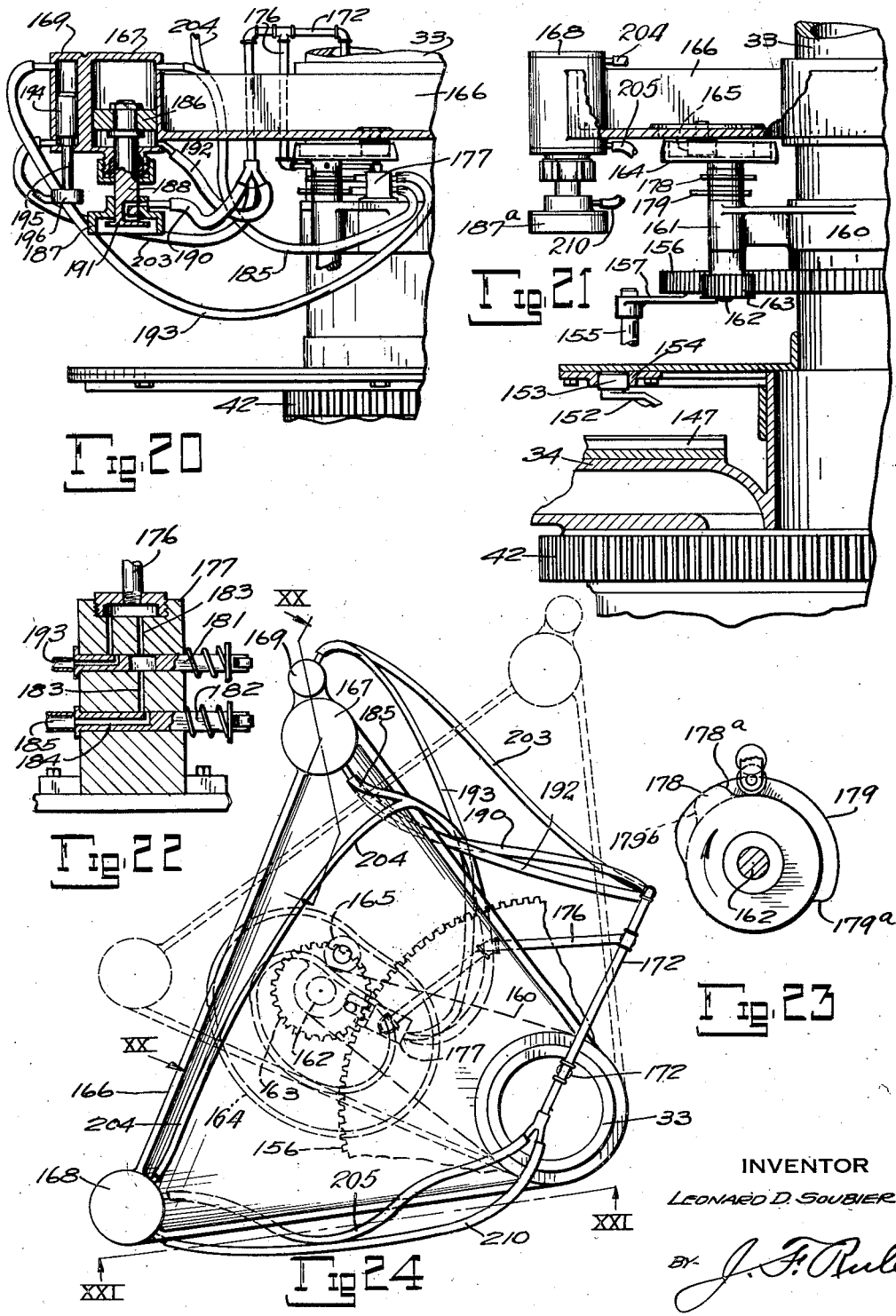

Patented Mar. 12, 1929.

1,705,341

UNITED STATES PATENT OFFICE.

LEONARD D. SOUBIER, OF TOLEDO, OHIO, ASSIGNOR TO THE OWENS BOTTLE COMPANY, OF TOLEDO, OHIO, A CORPORATION OF OHIO.

GLASS-BLOWING MACHINE.

Application filed August 27, 1923. Serial No. 659,451.

My invention relates to that type of machine for blowing bottles or other hollow glass articles, wherein there are two separate tables mounted for continuous rotation, these two tables designed to carry the blank or parison molds and the finishing molds respectively.

According to my invention, the blank mold table and the finishing mold table are arranged side by side and spaced apart with their adjacent portions moving in the same direction, in order that a transfer of the parison from the blank mold to the finishing mold may be effected during the time that such molds are adjacent each other and moving in the same general direction.

An object of this invention is the provision of a machine of the above character, in which a blank or parison is carried on the blank mold table to a predetermined point, then released from the blank mold and inverted by a transfer head on said table and brought by said head to a suspended position above and in alignment with the finishing mold bottom plate on the second table, where it is immediately enclosed by the finishing mold.

A further object is the provision of a continuously operating two-table machine, wherein the article being produced is under positive control from the moment the charge is received into the blank mold on the first table until it has been given its final shape in the finishing mold on the second table.

A further object is to avoid the necessity of inverting the blank mold on this type of machine.

Other objects of the invention will appear hereinafter.

In the accompanying drawings:

Figure 2 is a part sectional plan with the mold heads shown in different positions.

Figure 3 is a sectional elevation taken at the line III—III on Figure 2.

Figure 4 is a part sectional elevation taken at the line IV—IV on Figure 1, at the charging station.

Figure 5 is a part sectional elevation about at the line V—V on Figure 1, showing the transfer head disengaged from the blown article.

Figure 6 is a sectional elevation at line VI—VI on Figure 1.

Figure 7 is a section through the blank blow head at line VII—VII on Figure 5.

Figure 8 is a plan view of the transfer mechanism.

Figure 9 is a diagrammatic plan view showing various positions assumed by the transfer mechanism during the transfer operation.

Figure 10 is a sectional elevation at the line X—X on Figure 1, showing the transfer operating mechanism.

Figure 11 is a plan view of the neck mold in closed position.

Figure 12 is a view similar to Figure 11, with the mold open.

Figure 13 is a section at the line XIII—XIII on Figure 11.

Figure 14 is a section of the transfer head and also shows in broken lines the reversed position of said head.

Figure 15 is a section through the blank blow head at line XV—XV on Figure 6.

Figure 16 is a sectional elevation taken at line XVI—XVI on Figure 11.

Figure 17 is a sectional elevation through the valve control box on the blank mold blow head arm.

Figure 18 is a development of the cams for the above control box.

Figure 19 is a plan view of the control cams.

Figure 20 is a sectional elevation through the finishing mold blow head taken at the line XX—XX on Figure 24.

Figure 21 is a part sectional view showing the operating mechanism for said finishing mold blow head.

Figure 22 is a section through the valve control box on said blow head.

Figure 23 is a plan view of the cams for the finishing mold blow head valves.

Figure 24 is a plan view of the finishing mold blow head arm.

Figure 1:
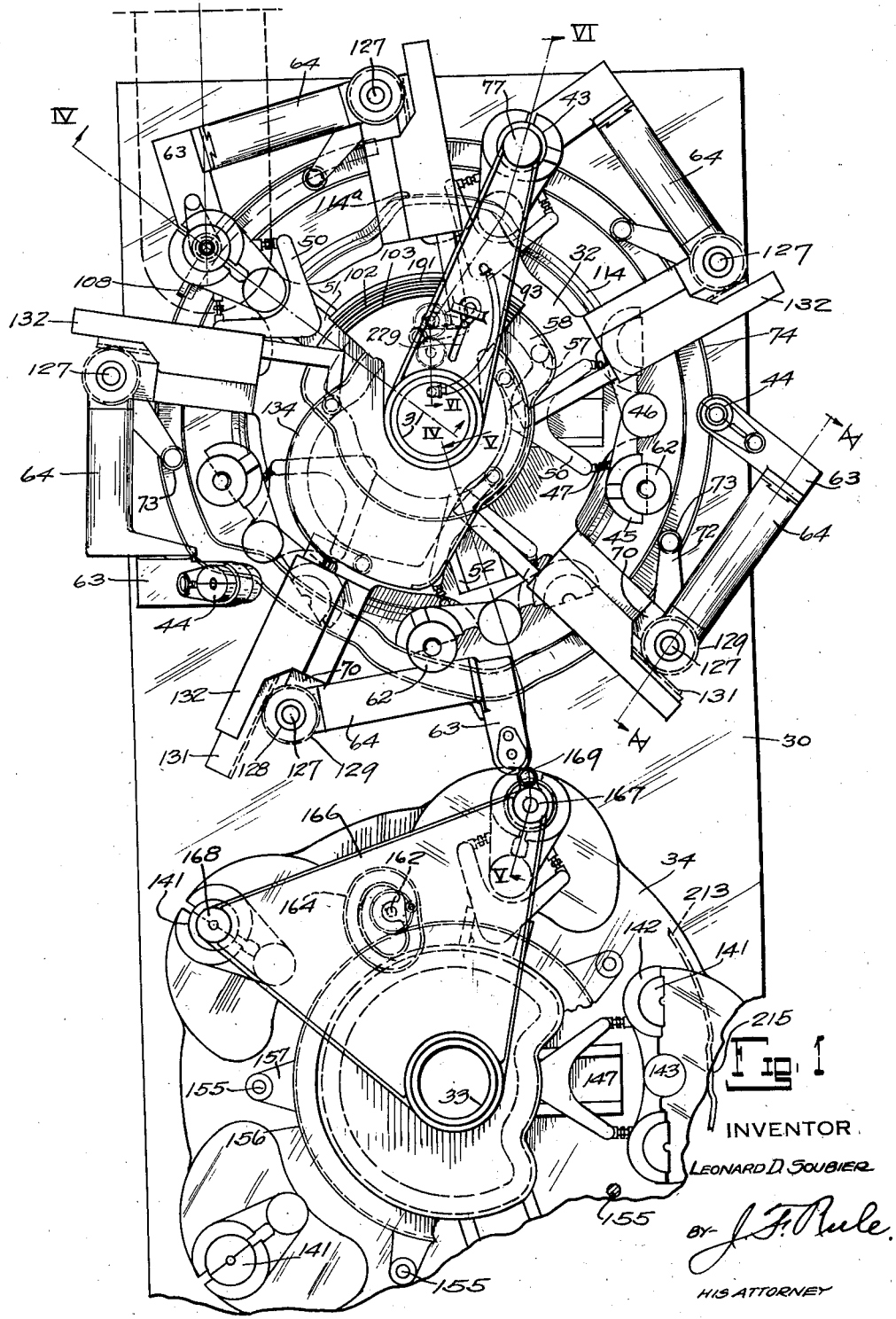
Figure 1 is a plan view of a machine constructed in accordance with my invention.

Referring particularly to Figures 1 and 2 of the drawings, 30 designates a base or platform adjacent one end of which is erected a column 31 designed to support the blank mold carriage 32. A similar support or column 33 is erected on the base adjacent the other end thereof and supports the blow mold carriage 34. The mold tables 32 and 34 are mounted for rotation on roller bearings 35 and 36 (Fig. 3) on drum castings 37 and 38 respectively and are driven by a motor (not shown) having driving connections with annular gears 41 and 42 on the blank and finishing mold carriages respectively. These mold carriages are each adaptively. These mold carriages are each adapted to carry a plurality of mold units hereinafter more fully described and which may be of any number desired. In the present instance, five of these units have been shown mounted on each table and as all the units on a table are alike, a description of one will be deemed sufficient for all.

Each blank mold unit comprises a sectional body or blank mold 43 and a sectional neck mold 44. The blank mold is made in horizontally separable sections mounted on arms 45 (see Fig. 8), said arms pivoted to swing about a bearing sleeve 46. Links 47 connect the mold arms with a yoke 50 on a slide 51 (Fig. 4) which reciprocates radially in guides 52 on the mold carriage 32, said guides extending radially of the machine. The yoke 50 is connected through a link 53 to a rock arm 54 on a rock shaft 55, to which is also connected a rock arm 56 having a cam roll 57 running in a stationary cam 58. This cam is so shaped as to effect the opening and closing of the blank molds at predetermined periods, as hereinafter noted.

As the mold carriage rotates, each mold unit is brought beneath a charging feeder 60 (Fig. 4) from which charges of glass 61 are supplied. At this time, the blank mold 43 is closed and in inverted position with the funnel guide 62 directly above and in alignment therewith, and the neck mold 44 is beneath and locked in register with the blank mold to form the neck end of the bottle.

Each neck mold is mounted on an adjustable head 63, said head forming a part of an inverting arm 64. Projections 65 of this arm are formed as slideways, in which the head 63 may be vertically adjusted by means of an adjusting screw 66. This adjustment is provided to allow for different height molds. In Fig. 10 the head 63 and parts carried thereby are shown in broken lines in a position of adjustment in which the center of gravity of the parison is in or a short distance above the horizontal plane of the axis of the inverting arm 64. Also the neck mold 44 or other blank holder is offset vertically and horizontally relative to the horizontal axis about which the blank swings. The arm 64 has a shaft projection 67 (Figs. 9 and 10) mounted in a bearing block 68, said block being mounted for oscillation in a bearing 69 formed in an extension 70 of the carriage 32. A shaft 71 extends from the bearing block through bearings 69 and has attached thereto an arm 72 carrying a cam roll 73, said roll running in a stationary cam 74. This cam controls the horizontal oscillation of the arm 64, thereby aligning the neck mold with either the blank mold or finishing mold.

Referring to Figures 1, 2, 5 and 9, it will be seen that the cam 74 is so shaped that it will hold the neck mold 44 in vertical alignment with the finishing mold during a predetermined period of its travel, in order that the blank may be blown to the shape of the finishing mold before the release of the neck mold is effected. After the neck mold carrying the bare blank has been completely inverted, a section 74$^a$ (Fig. 9) of the cam 74 is so shaped as to bring the neck mold 44 into alignment with the arc in which the finishing mold travels at the point where radius line "A" crosses said arc. Section 74$^b$ is shaped to guide the neck mold along the arc from radius line "A" to radius line "B" and thereafter section 74$^c$ swings it outward from said arc to point "C". Its position is then controlled for a predetermined period by section 74$^d$ of the cam. Section 74$^e$ is shaped to swing the neck mold back into normal position.

Immediately after a charge of glass is received in the blank mold 43, the combination blow head and closing plate 75 (see Fig. 15) is moved into position over the open upper end of the mold. This head, attached to the piston rod 76 of an air motor 77, is then lowered to close the mold by admitting air above the piston 78 of said motor through a pipe 81. Air under pressure is then admitted through the head 75 to compact the glass and cause it to take the shape of the neck mold. This air is supplied through a pipe 84 and a check valve 85 in the plate, said valve normally held closed by a spring 86. The mechanism for supplying compressed air to the blowing head plate 75 and air motor 77, and for blowing the parison to hollow form, together with the valve mechanism for controlling the air, will now be described.

Referring to Figures 3, 4, 5, 6 and 14 to 17 inclusive, air under pressure is supplied from any suitable source through pipe 87, 87$^a$ and 87$^b$ to a drum 37 forming part of the lower bearing of the blank mold carriage 32. The upper end of this drum is open, allowing air to pass to the passageways 89 formed in the mold carriage. A pipe 91 (Figs. 4, 6 and 17) leads from the drum 37 to a valve chest 92 mounted on an oscillating arm 93, this arm also carrying the air motor 77. Air under pressure is admitted to the motor 77 through pipes leading from the valve chest 92 in which are mounted valves 95.

Rigidly attached to the column 31 is a bearing bracket 220 (Fig. 6) having mounted thereon a shaft 221. Attached to the lower end of this shaft is a pinion 222 running in mesh with a ring gear 223, said ring gear attached to the mold carriage 32 and rotating therewith. Fastened to the upper end of shaft 221 is a pinion 224 running in mesh with a pinion 225, said pinion attached to one end of shaft 226. On the opposite end of this shaft is mounted a crank arm 227 carrying a roll 228, said roll running in a groove 229 formed in the blow head arm 93. Due to the rotation of ring gear 223 it will be seen that through the above mechanism, crank arm 227 will be rotated, thereby oscillating the arm 93 to and fro through a certain arc. The groove 229 is so shaped that the crank arm 227 will advance the arm 93 at the same angular speed as the mold carriage during the time the plate 75 is in its lowered position for closing the mold. Now, as the valve chest 92 and its actuating levers are carried by the arm 93, it will be noted that during the movement of the arm, the stationary cams 101, 102 and 103 will actuate the valves as follows: It will be supposed that blow head 75 is above and in register with a blank mold and just started on its clockwise movement. These valves are actuated by levers 96, 97 and 98 controlled respectively by stationary cams 101, 102 and 103 mounted on the column 31. The cam 103 will operate at 103ª (Figs. 18, 19) through the lever 98 to open its valve and supply air through pipe 81 to the upper end of cylinder 77, thereby lowering the plate 75, holding said plate lowered until reaching cam section 103ᵇ where the valve is closed. The cam 102 operates at 102ª through the lever 97, whereby its valve is opened and air is admitted through pipe 84, passages 104 and 105 (Fig. 15) in the piston and piston rod, then past the check valve 85 to the upper end of the mold 43 to compact the glass and insure a good neck finish. A section 102ᵇ is arranged to shut off the blowing air after a predetermined time interval. The cam 101 is arranged to actuate lever 96 to admit air through pipe 88 to raise the plate 75 immediately after section 103ᵇ closes off the air to the upper end of the cylinder. Springs 106 hold the valve levers in contact with their cams.

After the neck has been finished, the neck pin or plunger 107, which has been held in position in the neck mold 44 by a stationary cam 108 (Figs. 1 and 4), is released and withdrawn. This neck pin is mounted in a holder 110, said holder mounted to reciprocate in the head 63 and normally held retracted by the spring 111. After the plunger is retracted and the air through plate 75 is discontinued, a blow arm 112 (Figs. 6 and 16) pivoted on the carriage 32 is swung about its fulcrum 113 by a cam section 114ª of cam 114 contacting with a roller 115 on said arm. When the blow arm 112 swings from the Figure 4 position to that shown in Figures 6 and 16, air is admitted from chamber 89 (Figs 4, 5 and 6) through pipe 117, passages 118 and 119, (Fig. 7) pipe 121 (see Fig. 16) to the blow arm, thence through passageways 122 and 123 in the neck pin holder and neck pin respectively to supply an initial blow to the blank. The raising and lowering of the blow arm controls the admittance of air to the blank mold for the initial blow. When arm 112 is in the Figure 6 position, opening 121 of the arm is in communication with opening 119 in shaft 113, thereby allowing air to pass to the neck mold. When the arm is lowered, the air is automatically shut off. After the blank has been blown to hollow form, the blank mold opens, leaving the hollow blank projecting upward from and supported by the neck mold 44 on the head 63. This brings the operation up to the point shown in Figures 10 and 14.

Attached to the shaft 67 of the inverting arm 64 (see Fig. 10) is a bevel gear 125 running in mesh with a gear 126 on a shaft 127 of the bearing block 68. The gear 126 has a projecting sleeve 128 on which is mounted a pinion 129. Running in mesh with this pinion is a rack 131 (see Figs. 8 and 4) mounted for horizontal reciprocation in a standard 132. Attached to one end of the rack is a cam roll 133 controlled by a stationary cam 134, said cam shaped to operate to invert and reinvert the neck mold carrying head 63 at predetermined intervals. Projecting lugs 135 and 136 (Fig. 14) of the arm 64 limit its movement in either direction by contacting with a pin 137 projecting from the bearing block 68.

When the operations have progressed to the point indicated in Figure 9, a section 134ª (Fig. 8) of the cam 134 operates to move the rack 131 radially outward, thereby operating through the connections above described to invert the head 63 from the full line position, (Fig. 14), to the dotted line position, bringing the parison to a position pendent from the neck mold and in register with a mold bottom plate 140 on the finishing mold carriage 34 at the point where radius line "A" (Fig. 9) crosses the arc of the finishing mold. It will be observed that when the inverting head 63 is adjusted to the dotted line position shown in Fig. 10, the longitudinal axis of the parison which is vertical (see Fig. 14) is substantially perpendicular to a radial line drawn from the axis of rotation of the inverting head to the center of gravity of the parison. It will thus be seen that the longitudinal axis of the blank is substantially tangent to the arc which defines the movement of the center of gravity of the blank relative to the axis of inverting movement of the blank. The cam 134 is shaped at 134ᵇ to allow freedom of movement of the cam roll 133 in order that there may be no turning or inverting movement of the arm 64 during its horizontal movement, while traveling in alignment with the finishing mold from radius line "A" to line "B" (Fig. 9). When the inverting arm 64 reaches the position shown in Figure 8, the cam roll 133 is just entering the section 134ᶜ of the cam 134, this section being so shaped that the head 63 is quickly swung up to the position shown in Figure 5, so that during the continued travel of the tables there may be no interference between the neck molds 44 and the neck of the bottle which is projecting from the finishing mold. The section 134ᶜ blends into section 134ᵈ which is shaped to complete the inverting movement of the arm 64 during the further travel of the mold carriage 32.

Each complete finishing mold unit comprises a sectional finishing mold 141 and a bottom forming plate 140. The mold comprises separable mold sections mounted in arms 142 pivoted to swing about a bearing sleeve 143. Links 144 connect the mold arms with a yoke 145 on a slide 146 which reciprocates in guides 147 on the carriage 34. The yoke 145 is connected through a link 148 to a rock arm 150 on a rock shaft 151 to which is also connected a rock arm 152 having a cam roll 153 running in a stationary cam 154. This cam is so shaped as to effect the opening and closing of the mold at intervals, as hereinafter noted. As the mold carriage 34 rotates, each mold 141 is brought to a position at the radial line "A" (Fig. 9) where the parison is received into the finishing mold. The further rotation of the finishing mold table causes the molds to close about the parison so that it may be entirely enclosed upon reaching the radius line "B." Section 154ᵃ (Fig. 2) of the cam 154 is shaped to have the molds 141 just about closed upon reaching radius line "A".

Mounted upon and extending upward from the mold carriage 34 are vertical uprights 155 (Figs. 1, 2 and 21). A ring gear 156 having lug extensions 157 is arranged upon these uprights for travel with the carriage. Mounted upon the column 33 is a bearing casting 160 (Fig. 21) having formed at its outer end a bearing 161 and in which is freely mounted a shaft 162. Attached to the lower end of this shaft is a pinion 163, said pinion running in mesh with the ring gear 156. Attached to the upper end of the shaft 162 is a cam 164 in which runs a cam roll 165, said roll mounted on a blow head carrying arm 166. This blow head arm is mounted for oscillation on the column 33 and carries a pair of blow head cylinders 167 and 168 and a neck mold opening cylinder 169 (Fig. 20).

Referring to Figures 20, 21 and 24, it will readily be seen that the rotation of the carriage 34 will transmit motion from the gear ring 156 to pinion 163, which in turn rotates the cam 164, thereby oscillating the blow head arm 166 from the full line position Fig. 24, to the dotted line position. The cam 164 is shaped, as clearly illustrated in Figure 24, so that as it rotates, the arm 166 will be reciprocated to and fro through a short arc in timed relation to the molds. The oscillation of this arm allows the blow head cylinders 167 and 168 to register with two adjacent finishing molds at a certain point and travel therewith a predetermined distance in order that the parisons in said molds may be blown to their finished form. The blow head cylinder 167 meets a mold at the line "D" (Fig. 9) and travels therewith to the line "B", during which time air under pressure is admitted through the blow head to shape the glass in the mold.

Referring to Figures 3 and 20 to 24 inclusive, air under pressure is supplied through a pipe 87ᵇ to the drum 38, said drum being open at its upper end to allow air to pass into the passageways 171 formed in the finishing mold carriage 34. Air from this drum passes through pipe 172 (Figs. 3 and 20) to pipes 190, 192 and 203. A branch 176 leads to a valve casing 177 (Figs. 24 and 22) mounted on the stationary bearing casting 160. Mounted on the shaft 162 are two cams 178 and 179 for actuating valves 181 and 182 respectively. When the blow head cylinder 167 is brought into alignment with the mold at line "D", a section 179ᵃ (Fig. 23) of the cam 179 actuates valve 182, admitting air from pipe 176 to passage 183 of the valve casing and to passage 184 of the valve 182, thence through pipe 185 and to the upper end of the cylinder 167 to lower the piston 186 thereof. A blow head 187 mounted on the piston rod 188 is thereby brought into engagement with the plunger holder 110 (Fig. 3). Pipe 190 leading to the blow head has a constant air pressure so that when the blow head engages the neck pin holder, the piston rod continues to move downward until opening 191 in said rod is brought into alignment with the pipe 190 allowing air to pass from the blow head through passages 122 and 123 (Fig. 16) in the holder and neck pin to blow the bottle. This blowing continues until the blowing head reaches line "B" (Fig. 9), at which time section 179ᵇ (Fig. 23) of the cam allows the valve 182 to close. Due to the fact that a constant air pressure is maintained in pipe 192 leading to the bottom of the cylinder 167, it will be noted that when the valve 182 closes, the piston 186 will immediately move up, withdrawing the blow head.

Slightly before the blow head is raised, the section 178ᵃ of cam 178 (Fig. 23) actuates valve 181, admitting air through pipe 193 to the upper end of the cylinder 169, thereby lowering its piston 194. Attached to the piston rod 195 is a cam plate 196 which when lowered contacts with a stem 197 (Figs. 6, 8 and 16) mounted in the neck mold head 63. This stem is normally held projected by a spring 198, but when the cam plate is lowered the stem is pushed down and its conical end 200 contacts with pads 201 (Figs. 12 and 13) on the neck mold arms, opening the molds. The neck molds are normally held closed by a spring clip 202. Immediately after the neck molds are opened, the section 74ᶜ of cam 74 operates through connections hereinbefore described to swing the neck molds 44 from position in alignment with the finishing molds 141 at line "B" to point "C" (Fig. 9), in order to allow the neck molds to clear the neck of the bottle which is projecting from the mold (Fig. 5). The cam plate 196 is so shaped that it holds the neck molds open until they have entirely cleared. When the neck molds have reached point "C" (Fig. 9) the cam 178 allows the valve 181 to return to normal position (Fig. 22), thereby shutting off air to the upper end of cylinder 169. Pipe 203 is a branch of pipe 172 and, therefore, carries a constant air pressure so that the moment valve 181 closes, the piston 194 will move upward, withdrawing plate 196 and allowing the neck molds to close. At about the same time, the section 134ᶜ of cam 134 moves cam roll 133 inward and through the mechanism heretofore explained swings head 63 abruptly upward about its fulcrum 67 to the position shown in Figure 5. From this point on the cam section 134ᵈ acts, due to the carriage movement, to slowly revert the head 63 back to normal position (as shown in Figs. 4 and 6) and cam section 74ᶜ of cam 74 acts to bring the neck molds 44 into alignment with the blank molds 43 and hold them in such position during the formation of another blank or parison.

When the blow head 167 leaves the finishing mold at point "B", the blank has been blown to the shape of the finishing mold, but due to the fact that the glass is still quite hot it is very possible that this shape will not be retained. Therefore, another blow head 187ª (Fig. 21) has been provided, operated by a piston motor including the cylinder 168, (see also Fig. 24), to supply a further blow or setting of the glass. This blow head is of the same construction as blow head 167 and operates in synchronism therewith. A branch pipe 204 leads from pipe 185 for lowering the blow head, while pipe 205 connected to a constant supply pipe 172 operates to move the blow back to its normal position. Pipe 210 supplies blowing air to the second blow head. Air for cooling the blank molds is conducted from the drum 37 through channels 89 formed in the carriage 32 to the interior of the bearing sleeves 46 which, as shown in Figure 6, have ports opening into the hollow arms 45 which carry the mold sections. The air channels in the arms 45 terminate in openings 206 (Fig. 6). The cooling means for the finishing molds is similar to that of the blank molds. The air passes from channels 171 (Fig. 3) in the carriage 34 to bearing sleeves 143, thence through arms 142 to the molds. Ports 207 opening from the channels 171 communicate with nozzles 208 by which blasts of air are directed against the finishing mold bottoms 140.

The finishing mold bottom comprises an annular section 209 in which is freely mounted a bottom forming plate 140. The mold bottom is carried by a bracket 211 pivoted at 212 to permit the mold bottom to tilt and discharge the bottle after the finishing mold has opened. The mold bottom is returned to upright position by a stationary cam 213 on which runs a roll 214 on the bracket 211. The cam 213 is shaped at 215 (Fig. 2) so as to allow the mold bottom to tilt and discharge the articles. A section 154ᵇ (Fig. 2) opens the finishing molds, and section 154ᶜ holds them open while the discharge is being accomplished.

Modifications may be resorted to within the spirit and scope of my invention.

Certain subject-matter herein disclosed is being made the basis of claims in a divisional application.

What I claim is:

1. In a glass forming machine, the combination of continuously rotating blank and blow mold carriers, said carriers arranged side by side and spaced apart; blank molds and blow molds carried by the respective carriers, means to supply charges of glass to the blank molds, means to shape the glass in the blank molds, means to open the blank molds, mechanism to transfer the charges of glass from the open blank molds to the blow molds, means to close the blow molds around the glass, and means to blow the glass in the blow molds, said transfer mechanism comprising holding devices brought into holding engagement with the charges of glass before the opening of the blank molds and holding them until enclosed in the blow molds, whereby the glass is positively controlled until blown to finished form in the blow molds, said holding devices being mounted on one of said carriers and permanently retained thereon throughout their operation, and means separate from the molds to cause a relative movement of each holding device and the carrier on which it is mounted such that the holding device will move with a mold on the other carrier and without movement of translation relative thereto during a portion of the transfer period.

2. In a glass forming machine, the combination of a continuously rotating blank mold table, a blank mold carried thereby, a continuously rotating finishing mold table, a finishing mold carried thereby, said tables arranged side by side and spaced apart, a neck mold mounted on the blank mold table beneath and in register with the blank mold, means to form a blank in the blank mold, means including the neck mold to transfer the blank from the blank mold to the finishing mold, means to cause the neck mold to travel with the finishing mold while the blank is being enclosed in the finishing mold and blown therein, means to blow the blank in the finishing mold, and means operative thereafter to release the neck mold.

3. In a glass forming machine, the combination of a continuously rotating carriage including a blank mold table, a blank mold carried thereby, a continuously rotating carriage including a finishing mold table, a finishing mold carried thereby, said tables arranged side by side and spaced apart, a neck mold mounted on the blank mold carriage beneath and in register with the blank mold, means to form a blank in the blank mold, means including the neck mold to transfer the blank from the blank mold to the finishing mold, and means to invert the neck mold with the bare blank supported therein during said transfer.

4. In a glass forming machine, the combination of continuously rotating carriages including mold tables, said tables spaced apart horizontally, a blank mold and a finishing mold carried respectively by said tables, a neck mold mounted on one of said carriages, means to cause said neck mold to register successively with the blank mold and finishing mold, and means to transfer a blank from the blank mold to the finishing mold, including means to invert the neck mold with the bare blank supported therein during said transfer.

5. In a glass forming machine, the combination of continuously rotating carriages including mold tables, said tables spaced apart, a blank mold and a finishing mold carried respectively by said tables, a neck mold mounted on the blank mold carriage and arranged to register with the blank mold, means to invert the neck mold and thereby bring it to a position out of register with the finishing mold, means to then move the neck mold laterally into register with the finishing mold, and means separate from the molds to cause a continued lateral movement of the neck mold relative to the blank mold carriage such that the neck mold is maintained in register with the finishing mold during said continued movement.

6. In a glass forming machine, the combination of horizontally rotatable blank and blow mold carriers, arranged side by side, blank molds on the blank mold carrier, blow molds on the blow mold carrier, neck molds mounted on the blank mold carrier beneath the blank molds and in register therewith, means to open the blank molds, means including the neck molds to then invert the bare blanks and transfer them from the blank molds to the blow molds and cause the neck molds while supporting the blanks to travel with the blow molds, and means to blow the blanks to finished form in the blow molds.

7. In a glass forming machine, the combination of horizontally rotatable blank and blow mold carriers, arranged side by side, blank molds on the blank mold carrier, blow molds on the blow mold carrier, neck molds mounted on the blank mold carrier beneath the blank molds and in register therewith, means to open the blank molds, means including the neck molds for then inverting the bare blanks and transferring them from the blank molds to the blow molds, and means operative during said transfer to invert the blanks, said transfer means including means to cause the neck molds while supporting the blanks to travel a predetermined distance with the blow molds.

8. In a glass forming machine, the combination of laterally spaced mold tables, interconnected mechanism to rotate said tables continuously at a predetermined relative speed, a sectional blank mold on one of said tables, a neck mold in register therewith, means to supply a charge of glass to said molds, means to form the glass into a hollow blank in said molds, a sectional finishing mold on the second table and beyond the range of said blank mold, and a transfer device including said neck mold operable to transfer the blank from the blank mold to the finishing mold and hold the blank in the finishing mold while the molds are traversing a predetermined portion of their path of travel.

9. In a glass forming machine, the combination of laterally spaced mold tables, interconnected mechanism to rotate said tables continuously in synchronism, a sectional blank mold on one of said tables, a sectional finishing mold on the other table, and means to transfer a blank from the blank mold to the finishing mold by a movement transverse to the direction of movement of the molds during the transfer, said transfer means including a neck mold actuated by the movement of the mold tables and brought into register successively with the blank and finishing mold and cooperating therewith to form a finished article.

10. In a glass forming machine, the combination of laterally spaced mold carriages, means to rotate them in synchronism, a series of blank mold units on one carriage, said units each comprising a partible blank mold and a partible neck mold, said blank mold traveling continuously in a closed path, a series of finishing molds on the other carriage travelling in a second closed path spaced laterally from said first mentioned path, and automatic means controlled by the rotation of the carriages to cause each neck mold to first register with a blank mold, then carry the blank laterally from the blank mold to a finishing mold and register therewith.

11. A glass forming machine comprising, in combination, a blank mold table and a finishing mold table arranged side by side, means to rotate said tables, a blank mold and a finishing mold carried respectively by said tables, a neck mold mounted on the blank mold table, means for actuating the neck mold to transfer a blank from the blank mold to the finishing mold, and mechanism mounted on the blank mold table to cause the neck mold to travel in an arc concentric with the axis of rotation of the finishing mold and in register with the finishing mold during a predetermined period of travel of the latter.

12. A glass forming machine comprising, in combination, a blank mold table and a finishing mold table arranged side by side, means to rotate said tables, a blank mold and a finishing mold carried respectively by said tables, a neck mold, means for actuating the neck mold to transfer a blank from the blank mold to the finishing mold, said neck mold being mounted on the blank mold carriage and arranged to travel in register with the blank mold during the formation of a blank therein, and means to operate the neck mold for transferring the blank to the finishing mold and for guiding the neck mold independently of the finishing mold and causing it while thus guided to travel in an arc concentric with the axis of rotation of the finishing mold while in register with the latter.

13. In a glass forming machine, the combination of a blank mold carriage, a blank mold thereon, a finishing mold carriage, a finishing mold thereon, means to rotate said carriages in opposite directions about vertical axes, a blank holding and transferring device, means for actuating said device to transfer a blank from the blank mold to the finishing mold, and mechanism having permanent operating connections with the blank mold carriage for guiding said device and causing it, while holding the blank, to travel in register with the finishing mold during the travel of the latter through a predetermined arc.

14. In a glass forming machine, the combination of a blank mold carriage, a blank mold thereon, a finishing mold carriage, a finishing mold thereon, means to rotate said carriages in opposite directions, a blank holding and transferring device mounted on the blank mold carriage, means to actuate said device to transfer a blank to the finishing mold, and means operated from the blank mold carriage for guiding said device and causing it, while holding the blank, to travel with the finishing mold while the latter travels through a predetermined arc.

15. In a glass forming machine, the combination of a blank mold carriage, a blank mold thereon, a finishing mold carriage, a finishing mold thereon, means to rotate said carriages simultaneously in opposite directions, a neck mold, a neck mold carrier mounted on the blank mold carriage, means for holding said neck mold in register with the blank mold during the formation of a blank in the blank mold and neck mold, means for inverting the neck mold with a blank carried thereby and shifting it into position for the blank to be enclosed by the finishing mold, and means operating independently of the finishing mold to direct the neck mold and cause it while carrying the blank to travel with the finishing mold through a predetermined arc concentric with the axis of the finishing mold.

16. In a glass forming machine, the combination of a blank mold carriage and a finishing mold carriage arranged side by side, blank molds and finishing molds carried by said carriages respectively, means for continuously rotating said carriages in synchronism, means to shape parisons of glass in the blank molds, transfer mechanism operable independently of the finishing molds to transfer the parisons from the blank molds and move them laterally into position to be enclosed by the finishing molds and cause them to travel with the finishing mold carriage a predetermined distance while holding the parisons in said position, and means for blowing the glass to final shape in the finishing molds, said transfer mechanism being operated and controlled by the movements of said carriages.

17. In a glass forming machine, the combination of a blank mold carriage and a finishing mold carriage arranged side by side, blank molds and finishing molds carried by said carriages respectively, means for continuously rotating said carriages in synchronism about vertical axes, means to shape blanks of glass in the blank molds, transfer mechanism having permanent operating connections with the blank mold carriage and operable to transfer the parisons from the blank molds to the finishing molds, and means for blowing the glass to final shape in the finishing molds, said transfer mechanism comprising means brought into holding engagement with the glass before it leaves the blank mold and holding the parison and carrying it into position to be enclosed in the finishing mold, said holding means arranged to travel with the finishing mold carriage in an arc concentric with the axis of the finishing mold carriage a predetermined distance while holding the parison in said position.

18. In a glass forming machine, the combination of a blank mold carriage and a finishing mold carriage arranged side by side, blank molds and finishing molds carried by said carriages respectively, means for continuously rotating said carriages in synchronism about vertical axes, means to shape parisons of glass in the blank molds, transfer mechanism having permanent operating connections with the blank mold carriage and operable to transfer the parisons from the blank molds and move them laterally into position to be enclosed by the finishing molds and travel with the finishing mold carriage in an arc concentric with the axis of the finishing mold carriage a predetermined distance while holding the parisons in said position, and means for blowing the glass to final shape in the finishing molds, said transfer mechanism being mounted on one of said carriages and actuated and controlled by the movement of the carriage.

19. In a glass forming machine, the combination of mold carriages spaced apart horizontally, driving mechanism for rotating said carriages continuously about horizontally spaced vertical axes, a blank mold and a finishing mold carried respectively by said carriages, a neck mold, and operating connections between the neck mold and the carriage driving mechanism for moving the neck mold from a position in register with the blank mold to a position in register with the finishing mold and moving the neck mold forward a predetermined distance with the finishing mold in a path concentric with the axis of the finishing mold carriage.

20. The combination of a blank mold table, blank molds thereon, a finishing mold table, finishing molds thereon, said tables being arranged side by side, automatic means for continuously rotating said tables horizontally in opposite directions whereby the adjacent sides of the tables are continuously moving in about the same direction, and automatic means operating in synchronism with the movements of the mold tables for transferring blanks from the blank molds to the finishing molds and positively controlling the position of the blanks relative to the molds during the transfer.

21. The combination of a blank mold table, blank molds thereon, a finishing mold table, finishing molds thereon, said tables being arranged side by side, automatic means for continuously rotating said tables horizontally in opposite directions whereby the adjacent sides of the tables are continuously moving in about the same direction, and transfer mechanism operable automatically to transfer a blank from a blank mold to a finishing mold while the molds are moving in approximately the same direction, and positively controlling the position of the blank relative to the molds during the transfer.

22. The combination of a blank mold table, blank molds thereon, a finishing mold table, finishing molds thereon, said tables being arranged side by side, automatic means for continuously rotating said tables horizontally in opposite directions whereby the adjacent sides of the tables are continuously moving in about the same direction, and transfer mechanism operable automatically to transfer a blank from a blank mold to a finishing mold while the molds are moving in approximately the same direction and positively controlling the position of the blank relative to the molds during the transfer, said transfer mechanism comprising a holding device operable to engage and hold a blank before the blank is disengaged from the blank mold, maintain its hold on the blank during said transfer, and travel with and hold the blank during the travel of the blank with the finishing mold through a predetermined distance after being positioned to be enclosed in the finishing mold, and until after the finishing mold has enclosed the blank.

23. A glass forming machine comprising in combination a blank mold table and a finishing mold table arranged side by side, one rotating continuously and clockwise and the other rotating continuously and counterclockwise, so that the adjacent sides of said tables are continuously moving in about the same direction, a blank mold on one of said tables, a finishing mold on the other table, a partible neck mold cooperating with said blank mold, means controlled by the movement of the mold tables for moving the neck mold and blank away from the blank mold and into a position within the path of the finishing mold for transferring a blank from said blank mold to said finishing mold while said tables are moving, and means for opening said neck mold when in substantial registry with said finishing mold.

Signed at Toledo, in the county of Lucas and State of Ohio, this 24th day of August, 1923.

LEONARD D. SOUBIER.